(12) United States Patent
Seichter et al.

(10) Patent No.: US 7,024,789 B2
(45) Date of Patent: Apr. 11, 2006

(54) POSITION MEASURING DEVICE WITH A TEMPERATURE CORRECTION DEVICE

(75) Inventors: Martin Seichter, Traunstein (DE); Andreas Hager, Kirchweidach (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 28 days.

(21) Appl. No.: 10/455,242

(22) Filed: Jun. 5, 2003

(65) Prior Publication Data

US 2004/0024488 A1 Feb. 5, 2004

(30) Foreign Application Priority Data

Jun. 7, 2002 (DE) ................................ 102 25 243

(51) Int. Cl.
*G01B 5/00* (2006.01)
(52) U.S. Cl. .......................................... 33/702; 33/706
(58) Field of Classification Search ................ 33/702, 33/706, 707, 708, 503
See application file for complete search history.

(56) References Cited

U.S. PATENT DOCUMENTS

| | | | | |
|---|---|---|---|---|
| 4,808,048 A | * | 2/1989 | Miller | 409/239 |
| 4,895,454 A | * | 1/1990 | Kammleiter et al. | 374/163 |
| 5,031,331 A | * | 7/1991 | Herzog et al. | 33/503 |
| 5,408,758 A | * | 4/1995 | Mizutani et al. | 33/702 |
| 5,485,680 A | * | 1/1996 | Nelle | 33/705 |
| 5,650,852 A | * | 7/1997 | Chastain et al. | 356/630 |
| 5,711,084 A | * | 1/1998 | Spanner et al. | 33/706 |
| 5,833,407 A | * | 11/1998 | Senda | 409/131 |
| 6,029,118 A | * | 2/2000 | Strasser | 702/94 |
| 6,167,634 B1 | * | 1/2001 | Pahk et al. | 33/702 |
| 6,442,861 B1 | * | 9/2002 | Boge et al. | 33/706 |
| 6,446,350 B1 | * | 9/2002 | Nelle et al. | 33/702 |
| 6,532,680 B1 | | 3/2003 | Braasch et al. | |
| 6,578,283 B1 | * | 6/2003 | Nishi | 33/706 |
| 6,866,451 B1 | * | 3/2005 | Braasch et al. | 409/238 |
| 2002/0178601 A1 | | 12/2002 | Braasch et al. | |

FOREIGN PATENT DOCUMENTS

| | | |
|---|---|---|
| DE | 196 01 275 A1 | 7/1997 |
| DE | 199 04 472 A1 | 8/2000 |
| DE | 100 07 540 A1 | 9/2001 |

\* cited by examiner

*Primary Examiner*—Diego Gutierrez
*Assistant Examiner*—Amy R. Cohen
(74) *Attorney, Agent, or Firm*—Brinks Hofer Gilson & Lione

(57) ABSTRACT

A position measuring device that includes a first element having a material measure and a temperature measuring unit with a sensor, the temperature measuring unit is unable to be displaced relative to the material measure. A second element having a scanning head, and an electronic correction device that determines a temperature-corrected position value, wherein the first element is displaced in relation to the second element.

14 Claims, 5 Drawing Sheets

POSITION MEASURING DEVICE WITH A TEMPERATURE CORRECTION DEVICE

Applicants claim, under 35 U.S.C. § 119, the benefit of priority of the filing date of Jun. 7, 2002 of a German patent application, copy attached, Serial Number 102 25 243.2, filed on the aforementioned date, the entire contents of which is incorporated herein by reference.

BACKGROUND OF THE INVENTION

1. Field of the Invention

The present invention relates to a position measuring device, having a first element and a second element, wherein the first element can be displaced in relation to the second element. The present invention further relates to a method for position measuring by such a position measuring device. Finally, the present invention furthermore relates to a processing machine, in particular a machine tool.

2. Discussion of Related Art

Such position measuring devices often include a first component, for example a scale housing, in which a scale, or a measuring tape as a material measure, is housed, and of a second component, often a scanning carriage with a scanning head, by which scanning of the material measure is performed. Both components can be displaced in the measuring direction in relation to each other and can be mounted on respective elements, which can be displaced in relation to each other, of a processing machine, for example a machine tool, in order to determine the relative position of these elements which are displaceable with respect to each other.

In the course of operating such machine tools, heat is introduced into the machine tool, which comes from the drive mechanisms, bearings or guide devices. This heating leads to thermal expansions and deformations of the machine tool and is also transmitted to the material measure as a rule, so that a temperature-related length change can also be noted there. Thus, this heating in the end results in an interference with the processing accuracy of the entire machine tool.

There have been a large number of attempts to reduce the deterioration of the processing accuracy, for example by a matching construction of the machine tool. However, these offer only a limited optimization potential, so that often an active, temperature-dependent correction of the measured values is performed.

In DE 199 04 472 A1 of Applicant, an improved correction of temperature-dependent deformations of machine tools is achieved by a special placement of elongated temperature sensors. There, the evaluation of the temperature sensor signals takes place in the numerical control of the machine tool.

In accordance with DE 100 07 540 A1, the temperature gradient along a scale can be used for a temperature correction of a linear measurement. In this case the measured data from point-shaped individual sensors are appropriately processed.

A position measuring device is represented in DE 196 01 275 A1 of Applicant, wherein the local scale temperature is determined by a temperature sensor moved along with the scanning carriage. The corresponding temperature signal is transmitted via a cable to a stationary electronic device, in which a corrected position value is calculated.

The devices and methods of the prior art have, inter alia, the disadvantage that an alignment between the electronic evaluation device, which is customarily housed in the numerical machine control, and the position measuring device is required for a thermal correction. Incompatibilities often occur in the course of this, which in most cases can be removed only with a great expenditure of time, if at all.

OBJECT AND SUMMARY OF THE INVENTION

An object of the present invention is based on providing a device and a method for achieving highly precise processing results, wherein it is not necessary to perform an alignment between the machine control and the position measuring device, or a processing machine for a thermal correction.

This object is attained by a position measuring device that includes a first element having a material measure and a temperature measuring unit with a sensor, the temperature measuring unit is unable to be displaced relative to the material measure. A second element having a scanning head, and an electronic correction device that determines a temperature-corrected position value, wherein the first element is displaced in relation to the second element.

The above object is attained by a method for position measurement by a position measuring device including a first element and a second element, wherein the first element is displaced in relation to the second element in a measuring direction. The method includes activating a sensor of a temperature measuring device extending along the measuring direction in the first element, for determining a temperature of the sensor. Determining an uncorrected position of a scanning head assigned to the second element in relation to a material measure assigned to the first element. Correcting the determined uncorrected position of the scanning head relative to the material measure, based on the determined temperature of the sensor.

The above object is also attained by a processing machine that includes a first machine element, a second machine element that is displaced relative to the first machine element and a position measuring device. The position measuring device including a first element attached to the first machine element so as to being unable to be displaced relative to the first machine element. The first element having a material measure and a temperature measuring unit that has a sensor, the temperature measuring unit is unable to be displaced relative to the material measure. A second element connected with the second machine element so as to being unable to be displaced relative to the second machine element and having a scanning head and an electronic correction device that determines a temperature-corrected position value, wherein the first element is displaced in relation to the second element.

The advantages of the position measuring device of the present invention can be seen to rest in particular in that a high precision can be achieved by a solution which is comparatively cost-effective and simple to implement.

The present invention is based in particular on the concept that a temperature measurement is performed in the area of the material measure by activating individual sensors, so that a temperature profile can be determined, or that several individual temperatures along the measuring direction can be determined. The measured temperature values of one or several individual sensors are taken into consideration as a function of the uncorrected position of the scanning carriage, or of the scanning head fastened on the scanning carriage, relative to the material measure, for correcting the position value. The correction is performed with the aid of an electronic correcting device located at or in the scanning carriage. Then the position data corrected for temperature can be transmitted, for example serially, to a machine control device. The transmission of the temperature-corrected position data can take place via a cable, but also in a wireless manner. Because corrected position data are already transmitted here by the position measuring device, or from the processing machine, to a machine control device, this system can be employed universally and independently of the type of machine control device. It is not required to perform separate evaluations of the temperature sensor signal in the machine control device. Accordingly, no incompatibilities between the machine control device and the position measuring device, or the processing machine, occur with this type of temperature control.

The so-called fixed thermal reference point of the material measure is used as the geometric starting or zero point for the correction. The fixed thermal reference point of the material measure is to be understood to be that point, or possibly also that line, which does not move in relation to its base in case of a temperature change, even if this base has a different coefficient of thermal expansion than the material measure of the position measuring device. In this connection the scale housing in particular is to be the base, or also an element of a processing machine, for example the machine bed of a machine tool.

The term processing machine is not limited to machine tools; instead it also includes machines for equipping electronic components, or for processing semiconductor elements. Further than that, automated machines, such as robots, fall under the term processing machines.

As a rule, these processing machines also have at least one fixed thermal reference point (possibly also a line), which is distinguished in that it does not perform thermally dependent excursions relative to a point on a functionally relevant axis. In connection with machine tools, wherein a machine carriage or workpiece table can be displaced in the horizontal direction while the tool can only be moved in the vertical direction, this functionally relevant axis customarily is the movement axis of the tool. For the reverse case, when the workpiece table is not movable and instead the axis of movement of the tool is moved, the functionally relevant axis can extend orthogonally with respect to the measuring direction with respect to a point on the workpiece table, for example a corner.

In a further embodiment of the present invention, the temperature-dependent change in distance between the material measure and the fixed thermal reference point of the processing machine is also taken into consideration in addition to the temperature-dependent change of the distance between the fixed thermal reference point of the processing machine and of the scanning head.

Further details and advantages of the device of the present invention and the method of the present invention ensue from the subsequent description of an exemplary embodiment by the attached drawings.

Further advantages, as well as details of the present invention ensue from the subsequent description of exemplary embodiments by the attached drawings.

DETAILED DESCRIPTION OF THE PREFERRED EMBODIMENTS

Figure 1:
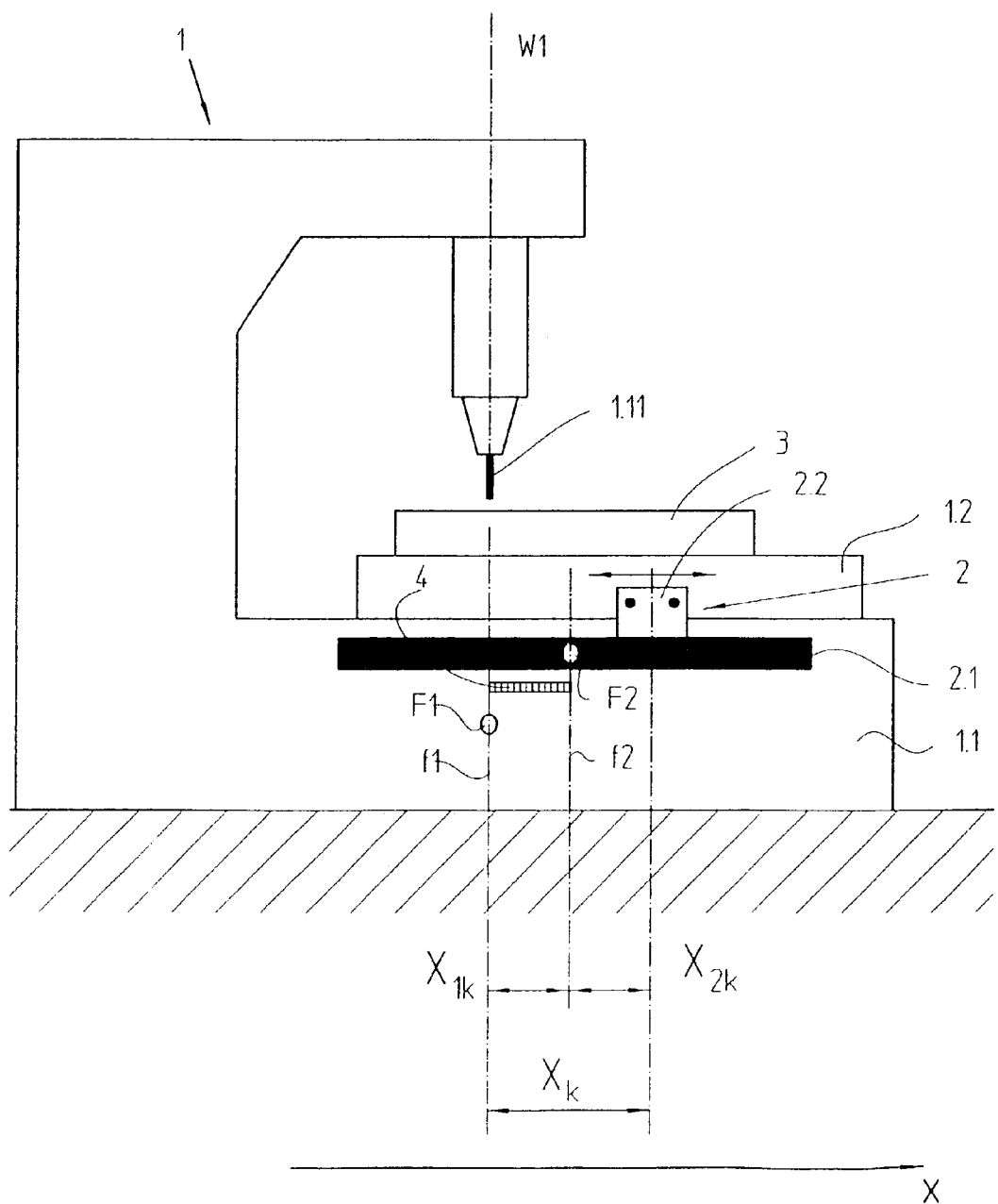
FIG. 1 is a schematic representation of an embodiment of a machine tool with a position measuring device in accordance with the present invention.

The arrangement described by the exemplary embodiment includes a machine tool 1 having a stationary machine bed 1.1 and a machine carriage 1.2, which can be displaced in relation to the machine bed. A workpiece 3 can be clamped to the machine carriage 1.2, which can be worked on by a tool 1.11, for example a milling tool. The relative position of the tool 1.11 to the workpiece 3 can be determined by a position measuring device 2. A scale housing 2.1 of the position measuring device 2 is fastened to the machine bed 1.1, and a displaceable scanning carriage 2.2 on the machine carriage 1.2 for this purpose. For reasons of clarity, only the measuring direction X is considered as the processing direction in the view. In the example shown, the tool axis W1 can be moved only in the vertical direction, not in the measuring direction X.

A temperature sensor 4 is furthermore attached to the machine tool 1. In accordance with FIG. 3, the temperature sensor 4 includes a meander-shaped strip conductor 4.1, which has been applied to a thin printed circuit board substrate 4.2. The strip conductor 4.1 has a temperature-dependent resistance, so that it can be used as a temperature sensor.

As shown in FIG. 1, the machine tool 1 has a fixed thermal reference point F1, which is distinguished in that a line, namely the so-called fixed thermal reference line f1 extending orthogonally to the measuring direction X through the fixed thermal reference point F1, is not displaced with respect to the tool axis W1, even if the temperature of the machine tool 1 changes. In the example shown, the fixed thermal reference point F1 lies on the extension of the tool axis W1.

As already mentioned, the position measuring device 2 includes a scale housing 2.1 and a scanning carriage 2.2. In accordance with FIG. 2a, a bore 2.13 is provided in the center area of the scale housing 2.1 of the position measuring device 2, by which the scale housing 2.1 can be solidly fastened to the machine bed 1.1 of the machine tool 1, for example by a screw connection. Moreover, the scale housing 2.1 can be fixed in place on the machine bed 1.1 at other points by screw connections, but this fastening is provided in such a way that a slight displacement in the X direction is possible between the scale housing 2.1 and the machine bed 1.1. This is achieved in that the respective bores in the scale housing 2.1, through which the fastening screws can be pushed, are provided in brackets 2.14 which have a comparatively low flexural strength with respect to the X direction.

Figure 2A:
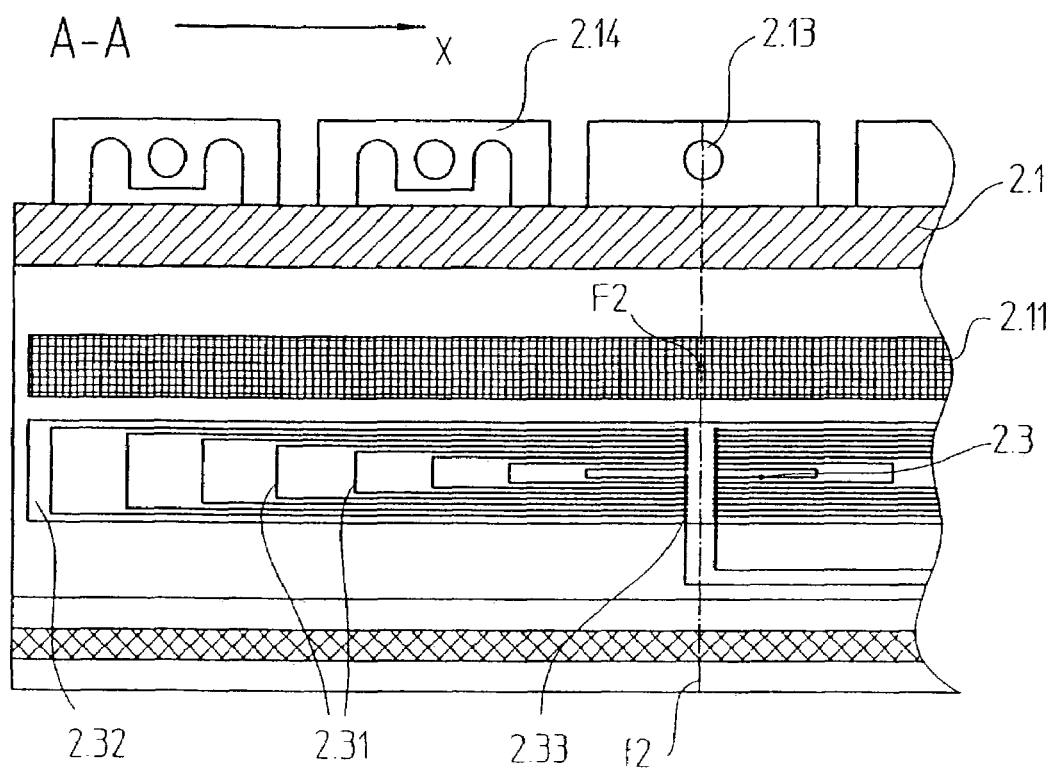
FIG. 2a is a longitudinal section through an embodiment of a scale housing of the position measuring device of FIG. 1 in accordance with the present invention.
Figure 2B:
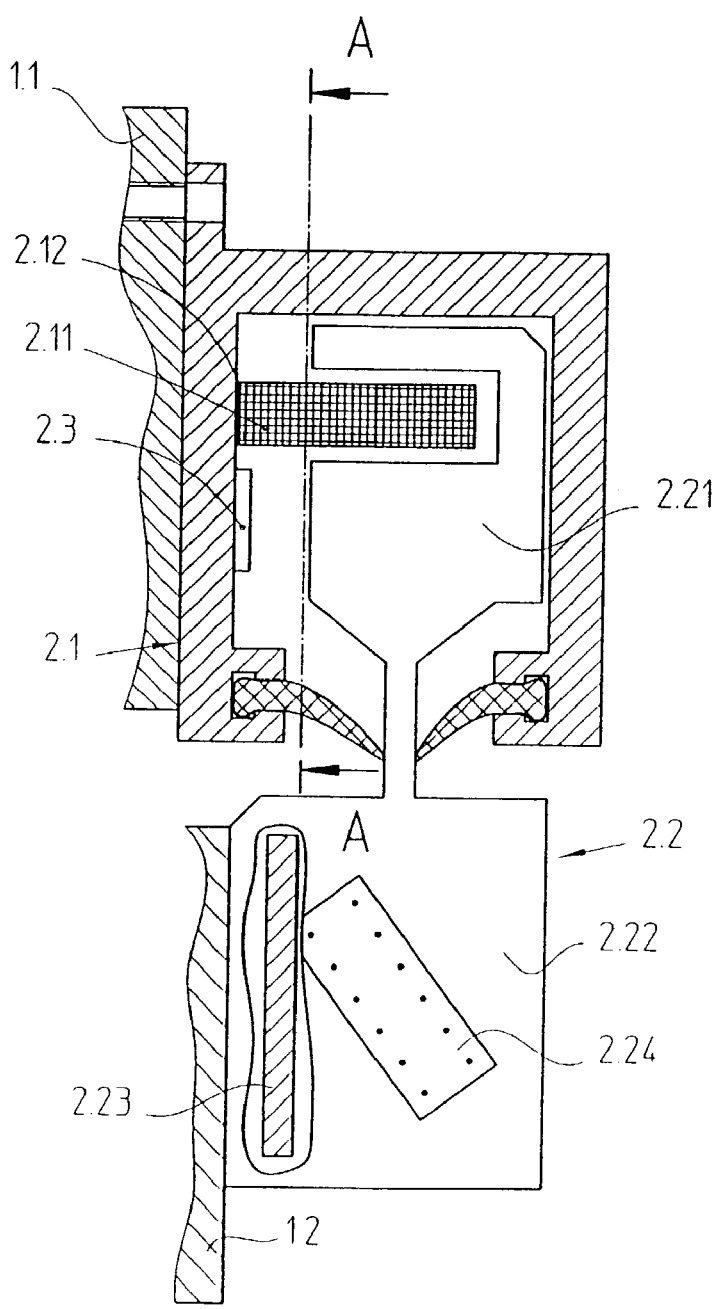
FIG. 2b is a cross section through the scale housing of FIG. 2a of the position measuring device of with an embodiment of a scanning carriage in accordance with the present invention.

In accordance with FIG. 2b, a scale 2.11, which is fixedly connected with the scale housing 2.1, for example by an adhesive connection 2.12, is located inside the scale housing 2.1. The scale 2.11 includes a glass body and therefore has a coefficient of thermal expansion of 8 ppm/K (parts per million/degree Kelvin). The scale 2.1 has a scale graduation in the form of a line pattern, wherein each line has a width of 10 μm at a temperature of 20° C., and wherein every gap between two adjoining lines also measures 10 μm. The adhesive connection 2.12 is such that the scale 2.11 can move practically freely within the limits provided with respect to the scale housing 2.1 in the measuring direction X. Because of the resultant equilibrium of forces during a temperature change of the scale housing 2.1, and therefore also of the scale 2.11 itself, the center of the scale 2.11, when viewed by a stationary viewer, remains in the same location, namely at its fixed thermal reference point F2. However, in case of warming the two ends of the scale 2.11 will move outward away from the fixed thermal reference point F2, and during cooling toward the fixed thermal reference point F2. Since the measuring direction X is relevant to the position measurement, it is possible to also use a fixed reference point line f2, which is oriented orthogonally with respect to the measuring direction X, and on which the fixed thermal reference point F2 lies, as a good approximation of the geometric reference for the thermal expansion of the position measuring device 2.

Moreover, in accordance with FIG. 2b, a temperature measuring unit 2.3, which extends parallel with the measuring direction X, is fastened on the inner wall of the scale housing 2.1. The temperature measuring unit 2.3 includes individual sensors attached to a printed circuit board substrate 2.32. In the example shown, the individual sensors are embodied as U-shaped strip conductors 2.31, wherein every U-shaped strip conductor 2.31 naturally has a reversion. The distance of a fixed point on the fixed reference point line f2 to the respective reversion is different for each U-shaped strip conductor 2.31. Each of the U-shaped strip conductors 2.31 has a temperature-dependent resistance and can therefore be used as a temperature sensor, wherein the resistance of each U-shaped strip conductor 2.31 permits the drawing of conclusions regarding the mean temperature in the respective area along the measuring direction X. As a result of the system, with this arrangement it is no longer necessary to perform a numerical integration, or averaging, during the evaluation process.

In principle, because of the attachment of the temperature measuring unit 2.3 at the wall of the scale housing 2.1, the temperature of the scale housing 2.1 is measured. In actual use it has been shown that the temperature difference between the scale housing 2.1 and the scale 2.11 is negligibly small. However, for as accurate as possible a measurement it is advantageous in principle, if the distance between the temperature measuring unit 2.3 and the scale housing 2.1 is kept small.

The scanning carriage 2.2 of the position measuring device 2 is, as represented in FIG. 2b, fastened on the machine carriage 1.2 of the machine tool 1, screwed to it in this case, so that when the machine tool 1 is operated, the scanning carriage 2.2 is moved together with the machine carriage 1.2. The scanning carriage 2.2 includes a scanning head 2.21 and a mounting base 2.22, in which electronic components are housed. One of these electronic components is the electronic correction device 2.23. The scanning carriage 2.2 moreover also has a serial interface 2.24.

The function of the position measuring device 2 is based on an optical principle, wherein the scale 2.11 is scanned by the scanning head 2.21 of the scanning carriage 2.2 by a transmitted light process. Alternatively to this, other measuring methods can also be used, for example magnetic scales can also be scanned, or inductive measuring principles can also be employed.

Figure 3:
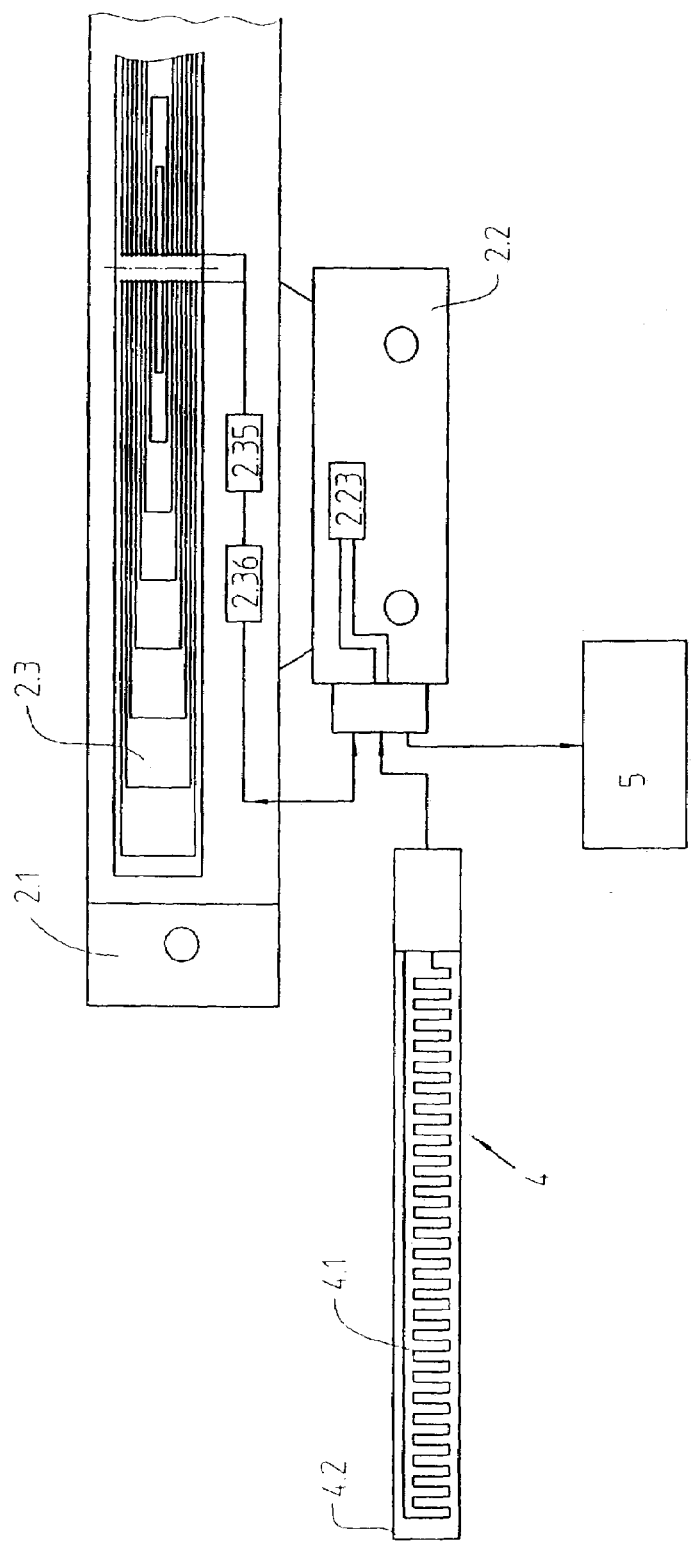
FIG. 3 is a schematic representation of an embodiment of an electrical circuit of the position measuring device of FIG. 1 in accordance with the present invention.

Moreover, in accordance with the schematic representation in FIG. 3, there are also electronic components in the scale housing 2.1, which are not shown in detail in FIGS. 2a and 2b. These are in particular a multiplexer 2.35 and an analog/digital converter 2.36. In accordance with FIG. 3, the end points 2.33 of the U-shaped strip conductors 2.31 are connected with a multiplexer 2.35, which is connected with an analog/digital converter 2.36, which itself is in an electrical connection with the electronic correction device 2.23 in the scanning carriage 2.2. The electronic correction device 2.23 is connected with a machine control device 5 via a serial interface 2.24 and a cable.

During the operation of the position measuring device 2, the multiplexer 2.35 is completely switched through at time intervals of 10 seconds, so that every one of the U-shaped strip conductors 2.31 is charged with a current and their resistance, and therefore their mean temperature, is determined by the common four-conductor technology. The temperatures are converted to digital data in the analog/digital converter 2.36 and are then passed on via a cable connection to the electronic correction device 2.23 in the scanning head 2.21, where they are stored.

The scanning of the scale 2.11 by the scanning head 2.21 takes place chronologically parallel with this. By this, the electronic device in the scanning carriage 2.2 determines how many scale graduations, or lines of the scale 2.11 are located between the fixed thermal reference point F2 and the actual position of the scanning carriage 2.2. In the represented example the center distance between two adjacent lines on the scale 2.1 is 20 μm at 20° C.

The absolute distance in millimeters or micrometers now depends on the mean temperature of the scale 2.11 in the relevant area, namely between the fixed thermal reference point F2 of the scale 2.11 and the actual position of the scanning carriage 2.2. The relevant area is selected based on the actual number of lines. Thereafter, the U-shaped strip conductor 2.31, whose reversion comes closest to the actual position of the scanning carriage 2.2, is determined. Then the electronic correction device 2.23 is interrogated regarding the corresponding temperature value of the selected U-shaped strip conductor 2.31. Now a correction of the measured length can be performed by the electronic correction device 2.23. For example, in this case 10 000 lines of the scale 2.11 have been passed by the scanning carriage 2.2 since it had passed the fixed thermal reference point F2. The U-shaped strip conductor 2.31 corresponding to this number of lines is now used for the temperature measurement. For example, a mean temperature of 32.5° C. is determined for this area. It is now possible to determine the temperature-corrected position $X_{2k}$, see FIG. 1, from the following equation:

$$X_{2k}=10000 \cdot 20 \text{ μm}+(10000 \cdot 20 \text{ μm} \cdot (32.5° \text{ C.}-20° \text{ C.}) \cdot 8 \text{ ppm/K}) \; X_{2k}=200000 \text{ μm}+20 \text{ μm}=200020 \text{ μm}.$$

The actual corrected distance $X_{2k}$ between the fixed reference point line f2 and the scanning carriage 2.2 therefore is 200020 μm.

Alternatively to the described method it is also possible to employ the average value of two U-shaped strip conductors 2.31, between which the scanning carriage 2.2 is located, for determining the temperature. It is also possible to increase accuracy by increasing the number of U-shaped strip conductors 2.31, or of individual sensors, at a given length of the scale 2.11.

The processing accuracy of the machine tool 1 can furthermore be increased if the thermally-caused expansion between the fixed reference point lines f1 and f2 is taken into consideration, i.e. in the end, the thermally corrected positions of the tool 1.111 and the machine carriage 1.2. This is achieved by taking into consideration the temperature between the fixed reference point lines f1 and f2, in that the mean temperature is determined via the temperature sensor 4. The electronic correction device 2.23 in the scanning carriage 2.2, which is connected with the temperature sensor 4 by a cable, is employed for determining the temperature.

In the example shown, the distance between the fixed reference point lines f1 and f2 is 400 000 µm at 20° C. During the operation of the machine tool 1, a mean temperature of 30° C. is now measured between the fixed reference point lines f1 and f2. The coefficient of thermal expansion of the machine tool 1 in the corresponding area between the fixed reference point lines f1 and f2 is 10.5 ppm/K.

Therefore the following corrected distance $X_{1k}$ between the two fixed reference point lines f1 and f2 results:

$$X_{1k}=400000 \text{ µm}+(400000 \text{ µm} \cdot (30° \text{ C.}-20° \text{ C.}) \cdot 10.5 \text{ ppm/K})$$

$$X_{1k}=400000 \text{ µm}+42 \text{ µm}=400042 \text{ µm}.$$

Therefore the corrected distance between the scanning carriage 2.2 and the fixed reference point line f1 is:

$$X_k=X_{1k}+X_{2k}=200020 \text{ µm}+400042 \text{ µm}=600062 \text{ µm}.$$

In the course of processing the workpiece 3 it is therefore possible to correct a linear error of 62 µm in the measuring direction X.

The corrected position value $X_k$ is passed on from the electronic correction device 2.23 in the scanning carriage 2.2 to a serial interface 2.24. At the serial interface 2.24 a cable of a control device 5 is located, and the latter receives the corrected position value of 600062 µm in the form of a multi-place digital codeword, without it being necessary there to make available a computer output for the correction.

Thus, the machine tool 1, or the position measuring device 2, is therefore able to issue an already corrected measured position value which, in particular if it is passed on as a digital value, can be read by any machine control device 5. In this way a machine tool 1, or a position measuring device 2, is created, which can be universally employed for the most varied types of machine control devices 5.

Figure 4:
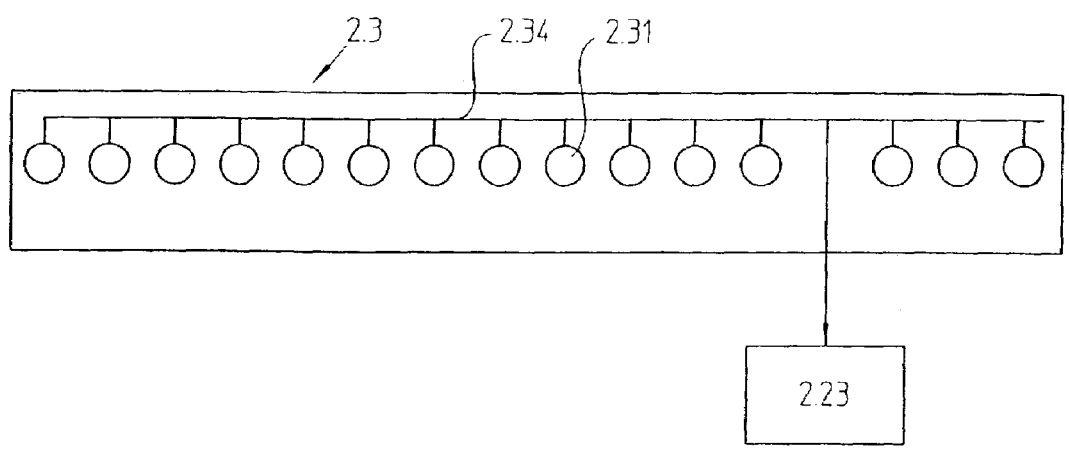
FIG. 4 represents an alternative embodiment of a temperature measuring unit to be used with the position measuring device of FIG. 1.

An alternative embodiment of the temperature measuring unit 2.3 is represented in FIG. 4. In this case the individual sensors 2.31 are connected with each other by a data bus 2.34. In the course of operation of the position measuring device 2, or of the machine tool 1, the electronic correction device 2.23 checks the temperatures at predetermined time intervals and stores them.

In response to the required coefficients of thermal expansion of the scale 2.11, or of the entire linear measuring system and the machine tool 1, the electronic correction device 2.23 can be configured in the form of a suitable EPROM module, for example. There is also the possibility of determining a suitable coefficient of thermal expansion of the position measuring device 2 and/or the machine tool 1 by software prior to putting the position measuring device 2 and/or the machine tool 1 into operation.

It is moreover also possible to perform an adaptation of the correction to the workpiece material used. If, for example, only aluminum is processed by the machine tool 1, this can already be taken into consideration when configuring the electronic correction device. In this case a knowledge of the workpiece temperature is also a prerequisite for an effective correction.

Further exemplary embodiments exist within the scope of the present invention besides the described examples.

We claim:

1. A position measuring device, comprising:
   a first element comprising:
      a scale; and
      a temperature measuring unit comprising a sensor, said temperature measuring unit is unable to be displaced relative to said scale;
   a second element comprising:
      a scanning head; and
      an electronic correction device that is integrally attached to said scanning head so as to move in unison with said scanning head, said electronic correction device determines a temperature-corrected position value; and
   a second sensor, by which a mean temperature of a machine element is detected in an area between a fixed thermal reference point of said scale and a fixed thermal reference point of said machine element, wherein said second sensor is in contact with an electronic device in said second element of said position measuring device for further processing of said measured values; and
   wherein said first element is displaced in relation to said second element.

2. The position measuring device in accordance with claim 1, wherein said temperature-corrected position value, based on measured results from said temperature measuring unit and an uncorrected position of said scanning head in relation to said scale, is determined.

3. The position measuring device in accordance with claim 2, wherein said second element comprises a serial interface that transmits said temperature-corrected position value to an electronic device for further processing.

4. The position measuring device in accordance with claim 1, wherein said second element comprises a serial interface that transmits said temperature-corrected position value to an electronic device for further processing.

5. The position measuring device in accordance with claim 1, wherein said sensor comprises a strip conductor.

6. The position measuring device in accordance with claim 5, wherein said strip conductor is U-shaped.

7. The position measuring device in accordance with claim 1, wherein said sensor is connected, via a multiplexer, with said electronic correction device.

8. The position measuring device in accordance with claim 1, further comprising a second sensor that is connected with said sensor by a data bus.

9. The position measuring device in accordance with claim 1, wherein at least one coefficient of heat expansion, which is required for determining said temperature-corrected position value, is preset in said electronic correction device.

10. The position measuring device in accordance with claim 9, wherein software presets said at least one coefficient of heat expansion in said electronic correction device.

11. A method for position measurement by a position measuring device comprising a first element and a second element, wherein said first element is displaced in relation to said second element in a measuring direction, the method comprising:
   activating a sensor of a temperature measuring device extending along said measuring direction in said first element, for determining a temperature of said sensor;

determining an uncorrected position of a scanning head assigned to said second element in relation to a scale assigned to said first element;

correcting on-site at said second element said determined uncorrected position of said scanning head relative to said scale, based on said determined temperature of said sensor;

determining a mean temperature of a machine element in an area between a first fixed thermal reference point of said machine element and a second fixed thermal reference point of said scale; and correcting said uncorrected position of said scanning head relative to said scale, based on said determined mean temperature of said sensor and said determined temperature of said machine element.

12. The method in accordance with claim 11, further comprising transmitting said corrected data to an electronic device for further processing.

13. The method in accordance with claim 11, further comprising presetting at least one coefficient of thermal expansion required for said correction.

14. A processing machine, comprising:
a first machine element;
a second machine element that is displaced relative to said first machine element;
a position measuring device, comprising:
 a first element attached to said first machine element so as to be incapable of being displaced relative to said first machine element, said first element comprising:
  a scale; and
  a temperature measuring unit comprising a sensor, said temperature measuring unit is incapable of being displaced relative to said scale;
 a second element fixedly connected with said second machine element so as to be incapable of being displaced relative to said second machine element, said second element comprising:
  a scanning head; and
  an electronic correction device that determines a temperature-corrected position value;
wherein said first element is displaced in relation to said second element and, wherein a second sensor is attached to said first machine element and is connected with said electronic correction device in said second element of said position measuring device for further processing of said measured values; and
wherein said first machine element comprises a fixed thermal reference point, and said scale of said position measuring device also comprises a second fixed thermal reference point, wherein a mean temperature of said first machine element in said area between said first and second fixed thermal reference points is determined by said second sensor, and said mean temperature between said second fixed thermal reference point of said scale and said second element is determined by said temperature measuring unit.

* * * * *